United States Patent
Beyer et al.

(10) Patent No.: US 6,877,963 B2
(45) Date of Patent: Apr. 12, 2005

(54) VACUUM PUMP

(75) Inventors: Christian Beyer, Köln (DE); Heinrich Engländer, Linnich (DE); Josef Hodapp, Köln-Sülz (DE)

(73) Assignee: Leybold Vakuum GmbH, Cologne (DE)

( * ) Notice: Subject to any disclaimer, the term of this patent is extended or adjusted under 35 U.S.C. 154(b) by 91 days.

(21) Appl. No.: 10/363,473

(22) PCT Filed: Aug. 10, 2001

(86) PCT No.: PCT/EP01/09252

§ 371 (c)(1),
(2), (4) Date: Feb. 28, 2003

(87) PCT Pub. No.: WO02/18794

PCT Pub. Date: Mar. 7, 2002

(65) Prior Publication Data

US 2003/0180162 A1 Sep. 25, 2003

(30) Foreign Application Priority Data

Sep. 2, 2000 (DE) ........................ 100 43 235

(51) Int. Cl.⁷ ............................ F04B 17/03; H02K 7/09
(52) U.S. Cl. .................... 417/365; 310/90.5; 417/423.4
(58) Field of Search ........................ 310/90.5; 417/365, 417/423.4, 423.12

(56) References Cited

U.S. PATENT DOCUMENTS

| | | | | |
|---|---|---|---|---|
| 4,036,565 A | | 7/1977 | Becker | 417/420 |
| 4,057,369 A | * | 11/1977 | Isenberg et al. | 417/365 |
| 4,312,628 A | | 1/1982 | Yamamura | 417/424 |
| 4,609,332 A | * | 9/1986 | Miki et al. | 417/365 |
| 4,717,315 A | * | 1/1988 | Miki et al. | 417/365 |
| 4,948,348 A | * | 8/1990 | Doll et al. | 417/365 |
| 5,059,092 A | | 10/1991 | Kabelitz et al. | 415/90 |
| 5,152,679 A | * | 10/1992 | Kanemitsu et al. | 417/423.4 |
| 5,166,566 A | | 11/1992 | Bernhardt et al. | 310/90.5 |
| 5,652,473 A | | 7/1997 | Delamare et al. | 310/90.5 |
| 6,201,329 B1 | * | 3/2001 | Chen | 310/90.5 |
| 6,464,472 B1 | * | 10/2002 | Sekiguchi et al. | 310/90.5 |

FOREIGN PATENT DOCUMENTS

| | | |
|---|---|---|
| DE | 2524061 | 12/1976 |
| DE | 3818556 | 12/1989 |
| DE | 4227663 | 2/1994 |
| EP | 0414127 | 2/1991 |
| EP | 0720272 | 7/1996 |
| FR | 2286298 | 4/1976 |
| FR | 2457397 | 12/1980 |
| GB | 2130655 | 6/1984 |
| JP | 9-21420 | * 1/1997 |

* cited by examiner

Primary Examiner—Michael Koczo
(74) Attorney, Agent, or Firm—Fay, Sharpe, Fagan, Minnich & McKee, LLP

(57) ABSTRACT

A rotor (12) is mounted in a stator (14) with radial magnetic bearings (16, 19) and with an axial magnetic bearing (40) in a contactless manner. The axial magnetic bearing (40) produces an axial magnetic field with a magnet coil (40) and a yoke iron (44) mounted on the stator (14). An axially magnetized permanent magnet (50) is provided on the rotor (12), located approxaimately axially opposite the yoke iron (44). A permanently axially magnetized compensating magnet (54) is provided on the stator (14) and arranged axially opposite the permanent magnet of the rotor (50) and polarized in the opposite direction, such that the permanent magnet (50) of the rotor and the compensating magnet (54) repel each other. In a center position, the rotor is bias-free by compensating the forces of attraction between the permanent magnet of the rotor and the yoke iron. As a result, the center position of the rotor can be adjusted with relatively small magnet coil flows. This results in small magnet coils, produces less heat and reduces the required power of the axial bearing.

12 Claims, 5 Drawing Sheets

VACUUM PUMP

BACKGROUND OF THE DISCLOSURE

The invention relates to a vacuum pump with a stator on which a rotor with at least one radial magnetic bearing and an axial magnetic bearing is supported in a contactless manner.

In vacuum pumps, magnetic bearings are frequently used for bearing the rotor. Magnetic bearings permit high rotational speeds of the rotor and are lubricant-free, whereby a pollution of the vacuum side of the pump by lubricant is excluded. From U.S. Pat. No. 5,166,566, a vacuum pump is known where the radial bearings are each formed by permanent magnet rings arranged so as to be slightly axially offset with respect to each other. Since the magnetic rings repelling each other also repel each other in an axial direction due to the offset arrangement, the rotor is biased in an axial direction. At an axial end of the rotor, a large lifting magnet is arranged which has an attracting effect upon a rotor disk. The lifting magnet is controlled in such a manner that it keeps the rotor in the axially biased position. In this case, the lifting magnet always has to compensate the axial bias. From U.S. Pat. No. 5,059,092, an axial bearing is known where two rotor disks are axially magnetized so that the stator-side magnet coils are able to act upon the rotor in both axial directions, depending on the direction of the current flowing therethrough. The rotor-side magnet disks have an attracting effect upon the yoke iron of the magnet coil so that in both axial directions, considerable forces of axial attraction occur that pull the rotor out of its axial central position and have to be compensated by the magnet coils.

It is the object of the invention to improve the axial magnetic bearing of a vacuum pump.

This object is solved, according to the invention, with the features of claim 1.

SUMMARY OF THE INVENTION

With the axial bearing of the vacuum pump according to the invention, the stator is provided with a permanently axially magnetized compensating magnet compensating the force effect of the magnetic field of the permanent magnet of the rotor upon the yoke iron. The compensating magnet is arranged so as to be polarized in opposite direction to the permanent magnet of the rotor so that the permanent magnet of the rotor and the compensating magnet repel each other. Separated by an air gap, the compensating magnet can be arranged directly opposite the permanent magnet of the rotor, but can also be arranged at another site of the extension of the yoke iron. The compensating magnet approximately compensates the axial forces of attraction between the permanent magnet of the rotor and the yoke iron of the stator. Thereby, an axial bias in the axial magnetic bearing is avoided. Therefore, the rotor can be held in a bias-free central position by means of the magnet coil. Because of the elimination of the axial bias, smaller magnet coils can be used for the safe control of the axial central position of the rotor. Due to the fact that the control forces of the magnet coil that have to be applied can be smaller, the heat development by the magnet coil is also considerably reduced.

According to a preferred embodiment, the axial magnetic bearing has an annular configuration, the magnet coil, the yoke iron, the permanent magnet of the rotor and the compensating magnet being annularly arranged about the rotor. Since the axial magnetic bearing is not arranged at one of the end faces of the rotor, but about the rotor, a vacuum pump with a short overall length is realized.

According to a preferred embodiment, several magnet coils with segment-like yoke irons are provided which are arranged, assembled so as to form a ring, about the rotor. Further, several distance sensors for detecting the rotor position can be provided about the circumference and be connected to a control device controlling the magnet coils for compensating tilting movements of the rotor. Thus, tilting movements of the rotor can be compensated. Because of the possibility of avoiding tilting movements of the rotor by an appropriate control of the magnet coils of the axial bearing, it is possible to use exclusively permanent magnets for the radial bearing(s), which do not allow a control of the bearing forces.

According to a preferred embodiment, the stator comprises an eddy current damping disk of electrically conductive material that is axially arranged between the permanent magnet of the rotor and the yoke iron. The eddy current damping disk effects a dampening of radial movements of the rotor by the eddy currents induced in the damping disk in the case of radial rotor movements. Thus, an effective radial dampening is realized which can be provided as an alternative or in addition to the active dampening of tilting movements of the rotor.

Preferably, the axial bearing is arranged approximately radially with respect to the center of gravity of the rotor and between the two radial bearings each of which is arranged axially with respect to the center of gravity of the rotor. The center of gravity of the rotor is located between the two radial bearings, whereas the axial bearing is located approximately in the transverse plane of the center of gravity. With this arrangement, a high tilt stability of the rotor is realized. At the same time, the axial bearing is arranged such that the magnetic axial bearings can effect a high torque for generating a corresponding tilting moment of the rotor.

According to a preferred embodiment, the magnet coil is arranged radially outside or radially inside with respect to the permanent magnets. The magnet coil and the permanent magnets are arranged approximately in a transverse plane. Thus, the overall length of the vacuum pump is kept small.

Preferably, the yoke iron, together with the compensating magnet, is inclined to the axial line and/or arranged so as to be radially offset with respect to the permanent magnet of the rotor. Thus, the air gap between the yoke iron and the compensating magnet, on the one hand, and the permanent magnet of the rotor, on the other hand, is inclined to the transverse plane and its surface is enlarged so that the use of larger magnets and, as a result, the realization of greater magnetic forces is made possible.

Preferably, one end of the yoke iron is arranged axially and the other end of the yoke iron is arranged radially with respect to the permanent magnet of the rotor. Because of the fact that the free yoke iron end is arranged radially outside or inside with respect to the permanent magnet of the rotor, a non-interlocked arrangement of the parts of the axial magnet bearing is realized. The complete rotor can be axially inserted into the stator from one side and be taken out of it, respectively. Thereby, a simple mounting of the rotor in the stator is facilitated.

When the permanent magnet of the rotor and the compensating magnet are arranged radially outside with respect to the magnet coil, the permanent magnet of the rotor and the compensating magnet can have a relatively large configuration so that great magnetic forces can be produced. Thereby, the axial bearing as well as the stabilization against tilting movements of the rotor are improved.

While the axial magnetic bearing is configured as an active magnetic bearing, the radial bearings are configured as passive magnetic bearings.

BRIEF DESCRIPTION OF THE DRAWINGS

Hereinafter, several embodiments of the invention are explained in detail with reference to the drawings. It is to be appreciated that the drawings illustrate preferred embodiments and are not to be construed as limiting the invention.

DETAILED DESCRIPTION OF THE PREFERRED EMBODIMENTS

Figure 1:
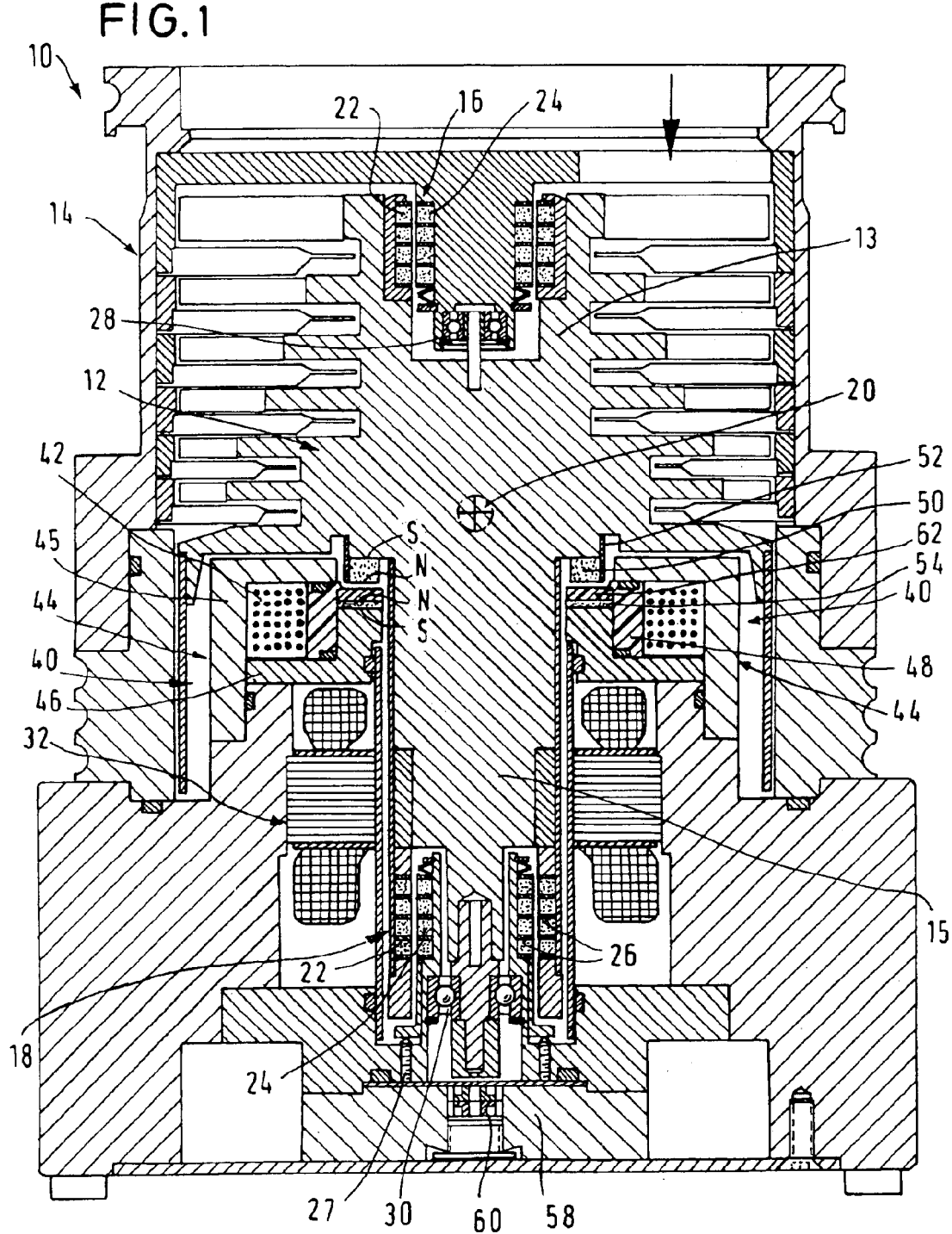
FIG. 1 shows a first embodiment of a vacuum pump according to the invention in longitudinal cross section.

FIGS. 1–5 respectively show vacuum pumps 10 that are turbomolecular vacuum pumps. Turbomolecular pumps operate at high speeds of up to 80,000 revolutions per minute. Due to the high speeds and the high reliability, contactless magnetic bearings have proved worthwhile for bearing the rotor 12 in the stator 14.

With the vacuum pumps of FIGS. 1–5, two passive radial magnetic bearings 16,18 are provided, respectively, which are arranged at the respective longitudinal ends of the rotor at an axial distance to the center of gravity 20 of the rotor 12. The center of gravity 20 of the rotor is located about in the middle between two radial bearings 16,18. Both radial magnetic bearings 16,18 are respectively formed of a cylindrical concentric inner sleeve 24 and outer sleeve 22 that are both magnetized in axial direction and are arranged so as to be polarized with respect to each other such that they radially repel each other. Each inner and outer sleeve 24,22 consists of a package of several magnetic rings that are axially joined. The several magnetic rings of an outer and inner sleeve, respectively, are axially separated from each other by spacer disks 26. The outer sleeves 22 are fastened to the rotor 12 and rotate about the inner sleeves 24 on the stator side. The two inner sleeves 24 and the two outer sleeves 22 of the two radial bearings 16,18 have an identical configuration.

The inner sleeves 24 of the two radial bearings 16,18 are axially adjustable by means of adjusting screws 27.

The two radial bearings 16,18 effect an unstable axial balancing situation, i.e., the rotor 12 tends to evade into the one or the other axial direction.

At each of the two axial ends of the rotor 12, a safety bearing 28,30 configured as rolling bearing is provided.

Substantially, the rotor 12 consists of a compressor portion 13 and a shaft 15. Axially between the compressor portion 13 and the radial shaft bearing 18, an electric motor 32 is arranged by which the rotor 12 is driven in a contactless manner. The electric motor 32 is a high-frequency motor.

An axial bearing 40 is arranged between the compressor portion 13 and the motor 32. The axial bearing 40 is a magnetic bearing and comprises an annular magnet coil 42 surrounded by a yoke iron 44 and producing a toroidal magnetic field. The yoke iron 44 consists of two rings 45,46 with an L-shaped cross section which form a frame that is rectangular in cross section and interrupted, i.e., open, at the inner compressor-side corner. Preferably, the yoke iron consists of a composite iron material with a plastics proportion of 5%. Thereby, the induction of eddy currents is kept low and the control of the axial bearing 40 is accelerated. A cylindrical sealing ring 48 seals the magnet coil in a gasproof manner.

Axially opposite the yoke iron 44, an axially magnetized annular permanent magnet 50 is fastened to the rotor compressor 13 and held at the rotor compressor 13 by a sleeve 52. The magnetic field produced by the magnet coil 42 acts attracting or repelling in axial direction upon the rotor ring magnet 50, depending on the polarization of the magnetic field produced, i.e., depending on the current direction in the magnet coil 42.

At the axial end face of the inner yoke iron ring 46, a permanently axially magnetized annular compensating magnet 54 is fastened that is polarized in opposite direction to the rotor-side magnet 50 so that the permanent magnet 50 of the rotor and the compensating magnet 54 repel each other. Thus, the magnetic forces of attraction produced by the rotor ring magnet 50 and the inner yoke iron ring 46 are approximately compensated by corresponding forces of repulsion between the rotor ring magnet 50 and the compensating ring magnet 54.

An active axial bearing is realized that is able to act in both axial directions, i.e., both attracting and repelling. By providing the compensating magnet 54, the control can be effected about an approximately bias-free axial central position. Due to the freedom of bias, only relatively small axial control forces are required to maintain the axial central position of the rotor 12. Thereby, the use of a small magnet coil 42 is permitted. Because of the altogether reduced required control performance, a smaller magnet coil and control device is made possible, and a lower heat build-up by the magnet coil 42 is achieved.

At the axial end of the rotor shaft 15, an axial inductive distance sensor 60 is provided at the stator housing 58, which detects the precise axial position of the rotor 12 by inductive distance measuring and transmits a corresponding measuring signal to a non-illustrated control device. Depending on the detected axial position, speed and acceleration of the rotor 12, the control device directs a corresponding control current to the magnet coil 42 to correct the axial position of the rotor 12 and to keep the rotor 12 in its central position.

Axially in front of the compensating magnet 54, the stator comprises an eddy current damping disk 62 of an electrically well-conducting material, copper, for example. Hence, the damping disk 62 is arranged axially between the rotor ring magnet 50 and the stator-side compensating magnet 54. Upon radial movements or vibrations of the rotor 12, the rotor ring magnet 50 induces electric eddy currents in the damping disk 62. Thereby, the mechanical energy of the rotor 12 is inductively transferred to the damping disk 62 and there, it is converted into heat. Thus, vibrations and oscillations of the rotor 12 are effectively dampened.

By the insulation ring 48, the magnet coil 42 is insulated with respect to the vacuum portion of the vacuum pump 10. Hence, the electric lines of the magnet coil 42 always extend outside the vacuum region of the vacuum pump 10 so that no sealing problems occur.

Figure 2:
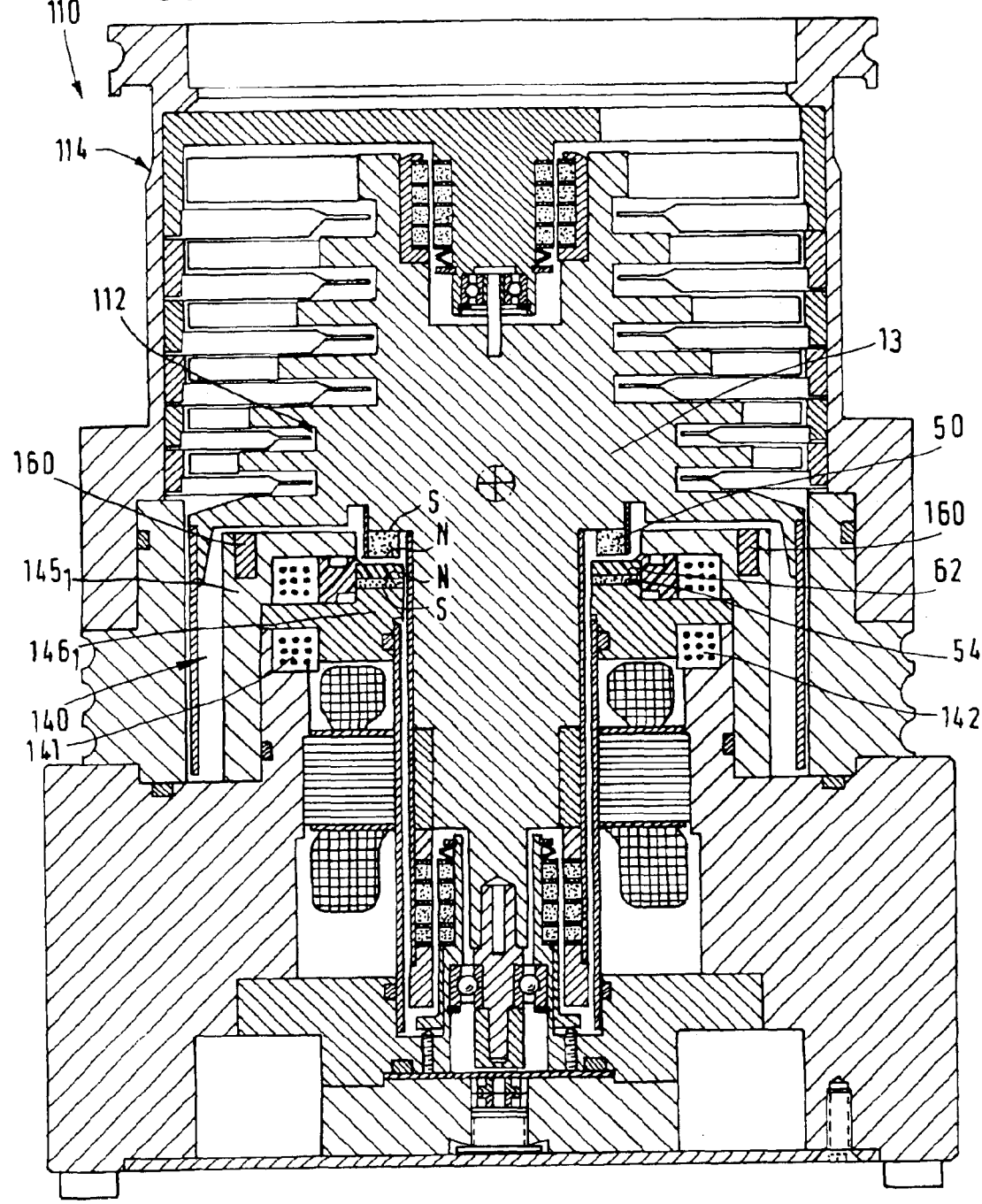
FIG. 2 shows a second embodiment of a vacuum pump according to the invention, comprising an axial bearing with three magnet coils.
Figure 3:
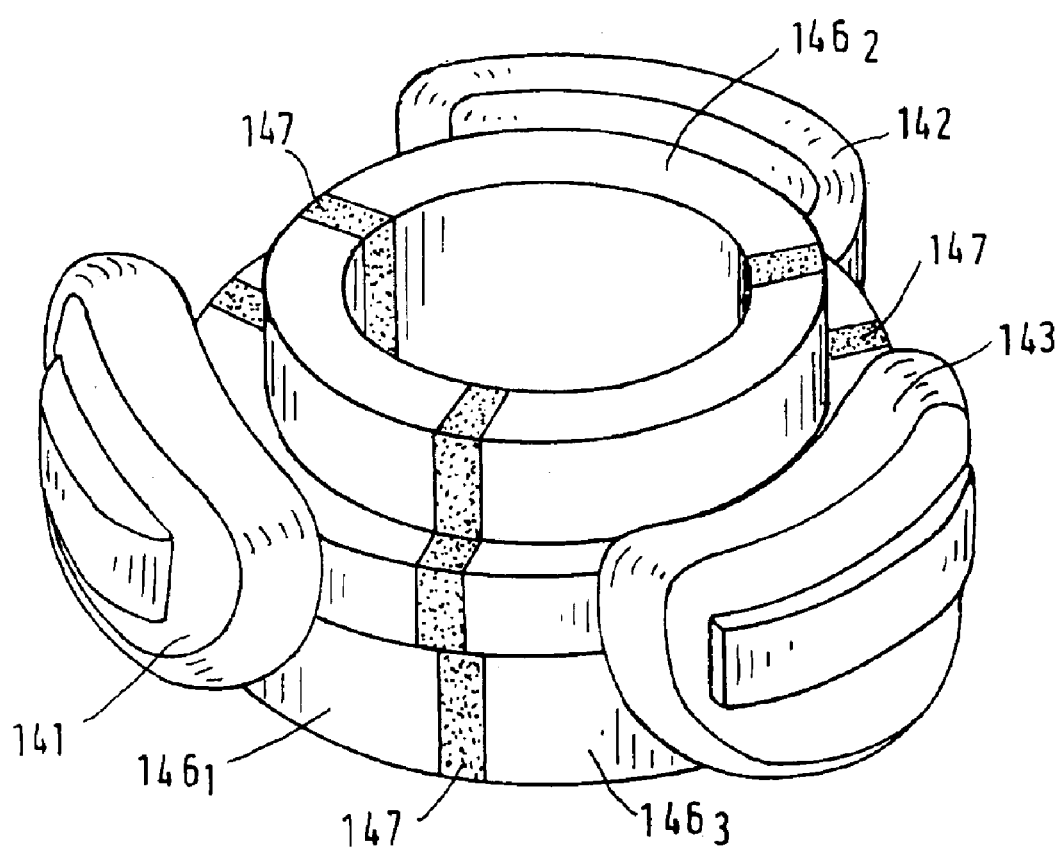
FIG. 3 shows the three magnet coils with the associated yoke irons of the axial magnetic bearing of the vacuum pump of FIG. 2.

The vacuum pump 110 illustrated in FIG. 2 is identical to the vacuum pump 10 illustrated in FIG. 1, except for the axial bearing 140. The axial bearing 140 of the vacuum pump 110 of FIG. 2 is not formed of one, but of three magnet coils 141,142,143 and corresponding inner ring sections $146_1, 146_2, 146_3$ of the yoke iron and corresponding outer ring sections $145_1$–$145_3$ of the yoke iron, as can also be seen in FIG. 3. Between the ring sections $146_1$–$146_3$, segments 147 of non-magnetic material are arranged that magnetically separate the yoke iron ring sections $146_1$–$146_3$ from each other. Further, three distance sensors 160 are provided which detect the axial distance of the rotor 12 from the stator 12 approximately in the transverse plane of the axial bearing 140. Because of the total of three axial distance sensors 160, the rotor position can be three-dimensionally detected, so that not only axial deviations from the central position, but also tilting movements of the rotor 12 can be detected. Tilting movements or tilting vibrations of the rotor 12 can be compensated by the magnet coils 141–143 that can be separately controlled by a control device.

Figure 4:
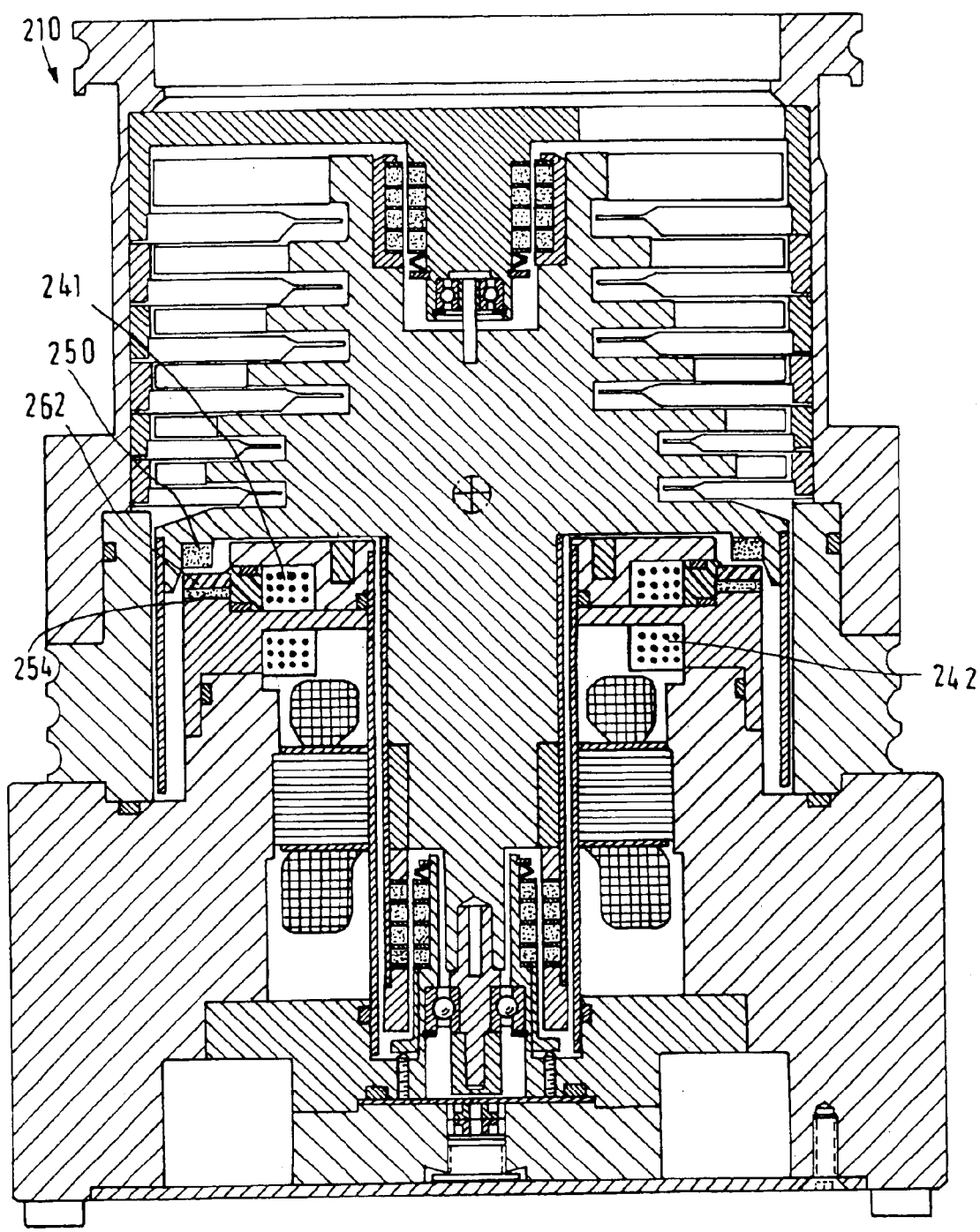
FIG. 4 shows a third embodiment of a vacuum pump where the permanent magnet of the rotor and the compensating magnet are arranged radially outside with respect to the magnet coil.

In the third embodiment of a vacuum pump 210 illustrated in FIG. 4, the magnet coils 241–243 are arranged radially inward and the rotor ring magnet 250, the stator compensating magnet 254 and the damping disk 262 are arranged radially outward with respect to the magnet coils 241–243. Thereby, larger permanent magnets are made possible that produce a larger torque upon the rotor and thus a greater stabilizing effect. By the larger permanent magnets, the carrying power of the axial bearing is increased.

Figure 5:
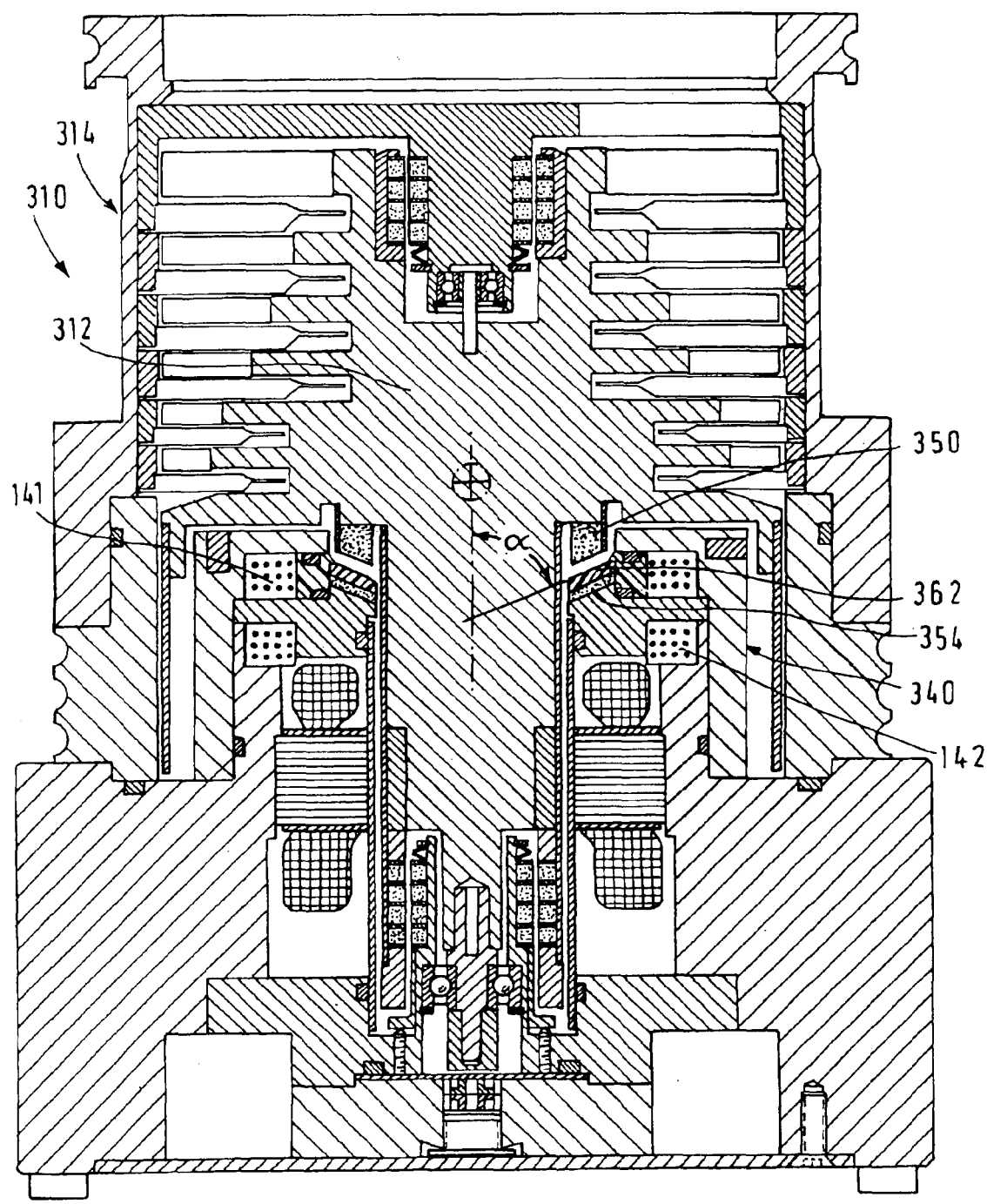
FIG. 5 shows a fourth embodiment of a vacuum pump according to the invention, with magnet gap surfaces inclined to the radial line.

In the fourth embodiment of a vacuum pump 310 illustrated in FIG. 5, the permanent magnet 350 of the rotor, the compensating magnet 354 of the stator and the damping disk 362 as well as the gap formed between the damping disk 362 and the permanent magnet 350 of the rotor are not arranged precisely in the transverse plane but inclined at an angle of approximately 15° thereto. The direction of magnetization of the magnets 350, 354 is also inclined by 15° with respect to the transverse plane. The magnetic forces transferred between the stator 314 and the rotor 312 are increased thereby, and they have both an axial and a smaller radial component. Thus, both the axial position of the rotor 312 in the stator 314 and the radial position of the rotor 312 in the stator 314 can be controlled by a suitable control of the magnet coils 141–143. Radial swerves and vibrations of the rotor can be reduced to a minimum thereby.

Because of the compensation of the forces of attraction between the permanent magnet of the rotor and the yoke iron by a compensating magnet, the rotor is bias-free in its central position. Thereby, the central position of the rotor can be controlled with relatively small magnet coil currents. This facilitates small magnet coils, effects a lower heat build-up and reduces the required power consumption of the axial bearing.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed:

1. A vacuum pump comprising:

a stator;

a rotor borne in the stator with a radial magnetic bearing and an axial magnetic bearing in a contactless manner, the axial magnetic bearing comprising:

a magnet coil with a yoke iron on the stator, the magnet coil producing an axial magnetic field, an axially magnetized permanent magnet located approximately axially opposite the yoke iron on the rotor, such that the magnetic field of the magnet coil acts to attract and repel the rotor magnet in an axial direction depending on the polarization of the magnetic field of the magnetic coil, and a permanently axially magnetized compensating magnet compensating the magnetic field of the permanent magnet of the rotor and being polarized in opposite direction to the rotor magnet.

2. The vacuum pump according to claim 1, wherein the axial magnetic bearing has an annular configuration, and the magnet coil, the yoke iron, the permanent magnet of the rotor and the compensating magnet are arranged annularly about the rotor.

3. The vacuum pump according to claim 1, further including:

a plurality of magnet coils with yoke irons arranged annularly about the rotor.

4. The vacuum pump according to claim 3, further including:

several distance sensors in a single transverse plane of the rotor for detecting rotor position and connected to a control device for controlling the magnet coils for compensating for tilting movements of the rotor.

5. The vacuum pump according to claim 1, further including:

an eddy current damping disk of electrically conductive material axially arranged on the stator between the permanent magnet of the rotor and the yoke iron.

6. The vacuum pump according to claim 1 wherein a first free end of the yoke iron is arranged axially and a second free end of the yoke iron is arranged radially with respect to the permanent magnet of the rotor.

7. The vacuum pump according to claim 1, wherein the magnet coil is arranged radially outside or inside with respect to the permanent magnets.

8. The vacuum pump according to claim 1, wherein an air gap between the yoke iron and the compensating magnet is inclined relative to a transverse plane.

9. The vacuum pump according to claim 1, wherein the magnet coil is arranged outside with respect to the permanent magnets.

10. A method of axially biasing the rotor of the vacuum pump of claim 1 relative to the stator, the method including:
applying current of a first polarity to the magnet coil causing attraction toward the permanent rotor magnet biasing the rotor in a first axial direction; and,
applying current of a second polarity opposite to the first polarity to the magnet coil causing repulsion from the permanent rotor magnet biasing the rotor in a second axial direction opposite to the first axial direction.

11. A vacuum pump comprising:

a stator;

a rotor borne in the stator with a radial magnetic bearing and an axial magnetic bearing in a contactless manner, the axial magnetic bearing comprising:
a magnet coil with a yoke iron on the stator, the magnet coil producing an axial magnetic field,
an axially magnetized permanent magnet located approximately axially opposite the yoke iron on the rotor, and
a permanently axially magnetized compensating magnet compensating the magnetic field of the permanent magnet of the rotor provided on the stator;

the axial bearing being arranged approximately radially with respect to a center of gravity of the rotor and between two radial bearings each of which is axially displaced from the center of gravity of the rotor.

12. A vacuum pump pump comprising:

a stator;

a rotor borne in the stator with a radial magnetic bearing and an axial magnetic bearing in a contactless manner, the axial magnetic bearing comprising:
a magnet coil with a ferrous yoke on the stator, the magnet coil producing an axial magnetic field,
an axially magnetized permanent magnet located approximately axially opposite the yoke on the rotor, and
a permanently axially magnetized compensating magnet compensating the magnetic field of the permanent rotor magnet provided on the stator; and the radial magnetic bearing including:
permanent magnet rings arranged without an axial offset with respect to each other.

* * * * *